US010600076B2

(12) United States Patent
Mirisola et al.

(10) Patent No.: US 10,600,076 B2
(45) Date of Patent: Mar. 24, 2020

(54) SYSTEMS AND METHODS FOR OBFUSCATED AUDIENCE MEASUREMENT

(71) Applicant: Google Inc., Mountain View, CA (US)

(72) Inventors: Raimundo Mirisola, Zug Zug (CH); Oliver Thomas Gaymond, Zurich (CH)

(73) Assignee: Google LLC, Mountain View, CA (US)

(*) Notice: Subject to any disclaimer, the term of this patent is extended or adjusted under 35 U.S.C. 154(b) by 596 days.

(21) Appl. No.: 14/459,671

(22) Filed: Aug. 14, 2014

(65) Prior Publication Data

US 2016/0048868 A1 Feb. 18, 2016

(51) Int. Cl.
G06Q 30/02 (2012.01)

(52) U.S. Cl.
CPC ......... *G06Q 30/0245* (2013.01); *G06Q 30/02* (2013.01)

(58) Field of Classification Search
CPC ....................................................... G06Q 30/02
See application file for complete search history.

(56) References Cited

U.S. PATENT DOCUMENTS

| 5,892,900 A | 4/1999 | Ginter et al. |
| 6,055,508 A * | 4/2000 | Naor ................. G06Q 10/0639 705/7.38 |
| 7,296,158 B2 | 11/2007 | Staddon et al. |
| 7,363,244 B2 | 4/2008 | Staddon et al. |
| 7,886,047 B1 * | 2/2011 | Potluri ................. H04L 67/22 709/224 |
| 7,937,428 B2 | 5/2011 | Beyer et al. |

(Continued)

FOREIGN PATENT DOCUMENTS

| CN | 101449557 | 6/2009 |
| CN | 102314488 A | 1/2012 |

(Continued)

OTHER PUBLICATIONS

International Search Report & Written Opinion on PCT/US2015/042778 dated Sep. 10, 2015.

(Continued)

Primary Examiner — Luis A Brown
Assistant Examiner — Robert C Johnson
(74) Attorney, Agent, or Firm — Foley & Lardner LLP

(57) ABSTRACT

A panel provider may transmit queries to an audience measurement server to retrieve measurement data for subsets of clients selected via one or more characteristics, such as characteristics of the client, characteristics of the client's device, characteristics of the received content, etc. To protect panel data, the panel provider need not identify these characteristics to the audience measurement server; rather, queries may be made via a plurality of filters that may be applied to client and/or content identifiers. Because the audience measurement server may apply the filters or data structures to select client data for retrieval without knowing what the filter represents, the panel provider's reason for any particular query may be hidden. For further obfuscation, the panel provider may provide a plurality of filters that individually may identify large numbers of clients, but when intersected or applied together, identify only the clients for whom measurement data is required.

14 Claims, 6 Drawing Sheets

(56) References Cited

U.S. PATENT DOCUMENTS

| | | | |
|---|---|---|---|
| 8,000,993 B2* | 8/2011 | Harvey | G06Q 10/0639 705/7.29 |
| 8,307,006 B2 | 11/2012 | Hannan et al. | |
| 8,417,966 B1 | 4/2013 | Mooneyham | |
| 8,429,266 B2 | 4/2013 | Vanheuverzwyn | |
| 8,498,995 B1 | 7/2013 | Gond et al. | |
| 9,305,056 B1 | 4/2016 | Gupta et al. | |
| 9,596,151 B2* | 3/2017 | Heffernan | H04L 43/04 |
| 9,639,577 B1 | 5/2017 | Lai et al. | |
| 10,325,272 B2* | 6/2019 | Hunt | G06Q 30/0201 |
| 2003/0177488 A1 | 9/2003 | Smith et al. | |
| 2004/0019675 A1* | 1/2004 | Hebeler, Jr. | G06Q 10/00 709/224 |
| 2004/0088212 A1* | 5/2004 | Hill | G06Q 30/02 705/7.32 |
| 2004/0091116 A1* | 5/2004 | Staddon | G06Q 20/3829 380/277 |
| 2005/0166046 A1 | 7/2005 | Bellovin et al. | |
| 2005/0166053 A1 | 7/2005 | Cui et al. | |
| 2006/0059277 A1* | 3/2006 | Zito | G06Q 30/02 710/15 |
| 2007/0277182 A1 | 11/2007 | Chen et al. | |
| 2009/0070797 A1* | 3/2009 | Ramaswamy | H04L 12/66 725/10 |
| 2010/0070514 A1 | 3/2010 | Woodruff | |
| 2011/0015989 A1* | 1/2011 | Tidwell | G06Q 30/02 705/14.43 |
| 2011/0153391 A1* | 6/2011 | Tenbrock | G06Q 30/02 705/7.33 |
| 2011/0224992 A1 | 9/2011 | Chaoui et al. | |
| 2011/0231264 A1* | 9/2011 | Dilling | G06Q 30/02 705/14.71 |
| 2012/0005213 A1* | 1/2012 | Hannan | G06Q 30/02 707/741 |
| 2012/0066065 A1* | 3/2012 | Switzer | G06Q 20/10 705/14.53 |
| 2012/0124161 A1* | 5/2012 | Tidwell | G06F 21/6254 709/217 |
| 2012/0304210 A1 | 11/2012 | Zaslavsky et al. | |
| 2012/0310729 A1* | 12/2012 | Dalto | G06Q 30/02 705/14.43 |
| 2013/0035979 A1 | 2/2013 | Tenbrock | |
| 2013/0173917 A1* | 7/2013 | Clifton | G06F 21/6227 713/167 |
| 2013/0190950 A1 | 7/2013 | Shukla | |
| 2013/0217332 A1* | 8/2013 | Altman | H04H 60/90 455/41.2 |
| 2013/0217333 A1* | 8/2013 | Sprigg | G06Q 30/0207 455/41.2 |
| 2013/0339526 A1 | 12/2013 | Ruellan et al. | |
| 2014/0025684 A1 | 1/2014 | Hess | |
| 2014/0036912 A1 | 2/2014 | Hui et al. | |
| 2014/0075018 A1* | 3/2014 | Maycotte | H04L 67/22 709/224 |
| 2014/0108435 A1 | 4/2014 | Kolesnikov | |
| 2014/0337104 A1* | 11/2014 | Splaine | G06Q 30/0204 705/7.33 |
| 2014/0344934 A1 | 11/2014 | Jorgensen | |
| 2015/0186403 A1* | 7/2015 | Srivastava | G06F 16/215 707/692 |
| 2016/0021202 A1* | 1/2016 | Peterson | H04L 67/22 709/204 |
| 2016/0203211 A1* | 7/2016 | Milton | H04L 51/20 705/14.58 |
| 2016/0247175 A1* | 8/2016 | Milton | H04W 4/029 |
| 2017/0006342 A1* | 1/2017 | Nagaraja Rao | H04N 21/4663 |
| 2019/0012480 A1* | 1/2019 | Thorwirth | G06Q 30/02 |

FOREIGN PATENT DOCUMENTS

| | | |
|---|---|---|
| CN | 103238295 | 8/2013 |
| WO | WO-2013/033122 | 3/2013 |

OTHER PUBLICATIONS

International Search Report and Written Opinion on Application No. PCT/US2014/023308 dated Aug. 14, 2014.
Final Office Action Issued on U.S. Appl. No. 14/140,263 dated Mar. 22, 2017.
U.S. Office Action on U.S. Appl. No. 14/140,263 dated Aug. 11, 2016.
U.S. Office Action on U.S. Appl. No. 14/140,263 dated Mar. 22, 2017.
Canadian Office Action issued for 2934852 dated Apr. 20, 2017 (4 pages).
Extended European Search report for application No. 16191495.7 dated Jan. 4, 2017 (9 pages).
Non-Final Office Action issued on U.S. Appl. No. 14/594,733 dated Aug. 12, 2016 (24 pages).
Canadian Office Action for 2,934,852 dated Mar. 27, 2018.
Non-Final Office Action on U.S. Appl. No. 14/140,263 dated Jul. 19, 2018.
Chinese Office Action Received for Application No. 201480071094. X, Google LLC, Apr. 8, 2019, 5 pages.
Dong [et al.,]"When Private Set Intersection Meets Big Data: An Efficient and Scalable Protocol," CCS'13, pp. 789-800 (2013).
Examination Report Received for European Application No. 16191495. 7, Google LLC, Mar. 8, 2019, 5 pages.
Final Office Action on U.S. Appl. No. 14/140,263 dated Feb. 19, 2019.
Kerschbaum, "Outsourced Private Set Intersection Using Homomorphic Encyrption," ASIACCS'12, 10 pages, (2012).
Bloom, "Space/Time Trade-Offs in Hash Coding with Allowable Errors" ACT, vol. 13, No. 7, dated Jul. 1970 (5 pages).
International Preliminary Report on Patentability for Appln. Ser. No. PCT/US2014/023308 dated Jul. 7, 2016 (10 pages).
International Preliminary Report on Patentability on Appln. Ser. No. PCT/US2014/023308 dated Jul. 7, 2016 (10 pages).
Lall et al., "The Bitwise Bloom Filter" University of Rochester Technical Report TR-2007/927, dated Nov. 29, 2007 (25 pages).
Notice of Allowance on CA Appln. Ser. No. 2,934,852 dated Feb. 28, 2019 (1 page).
Notice of Allowance on U.S. Appl. No. 14/140,263 dated Jun. 19, 2019 (2 pages).
Notice of Allowance on U.S. Appl. No. 14/140,263 dated Jun. 4, 2019 (22 pages).
Notice of Allowance on U.S. Appl. No. 14/140,263 dated Sep. 16, 2019 (2 pages).
Office Action on CN Appln. Ser. No. 201480071094.X dated May 28, 2018 (13 pages).
Office Action on CN Appln. Ser. No. 201580034952.8 dated Feb. 15, 2019 (24 pages).
Office Action on CN Appln. Ser. No. 201580034592.8 dated Sep. 16, 2019 (27 pages).
Raykova et al., "Secure Anonymous Database Search," ACM, CCSW/09, dated Nov. 13, 2009 (12 pages).
Foreign Action other than Search Report on CN 201580034952.8 dated Dec. 27, 2019.
Foreign Action other than Search Report on IN 201647020602 dated Nov. 22, 2019.

\* cited by examiner

SYSTEMS AND METHODS FOR OBFUSCATED AUDIENCE MEASUREMENT

BACKGROUND

Audiences for content blocks, such as broadcast media or online streamed media, including commercial advertising, are typically measured via single-source data panels consisting of individuals or households recording content exposure over time. Potential audience values for each block are then used for planning and purchasing advertising slots. By utilizing a single-source, changes in behavior can be measured over time responsive to different campaigns. In non-broadcast platforms, such as online media delivery systems, content publishers may insert ads for users, via interstitial ads in videos, banners, etc. Panel members may run monitoring software such as browser plug-ins or extensions that transmit identifiers of received content to the panel provider for aggregation. However, aggregating data from a large variety of sources may result in a significant lack of privacy for panel members.

SUMMARY

To provide cross-media audience measurement data or data from different sources that may be integrated with panel-captured data, a lightweight communication or a "ping" may be transmitted from a client device to an audience measurement server. The ping may include a plurality of client identifiers, such as a panel session identifier or a cookie, a device identifier, an address identifier, or other such identifiers; and an identification of the content. The content may include video, audio, multimedia, advertising, or any other type and form of content. In some implementations, the panel provider may transmit queries to the audience measurement server to retrieve measurement data for subsets of clients selected via one or more characteristics, such as characteristics of the client, characteristics of the client's device, characteristics of the received content, etc. To protect panel data, the panel provider need not identify these characteristics to the audience measurement server; rather, queries may be made via a plurality of filters that may be applied or matched to client and/or content identifiers. In some implementations, the panel provider may provide one or more bitmap filters to be applied to identifier binary strings representing characteristics, or may provide one or more probabilistic data arrays, such as Bloom filters, for retrieval of data by the audience measurement server. Because the audience measurement server may apply the filters or data structures to select client data for retrieval without knowing what the filter represents, the panel provider's reason for any particular query may be hidden. For further obfuscation, the panel provider may provide a plurality of filters or data arrays that individually may identify large numbers of clients, but when intersected or applied together, identify only the clients for whom measurement data is required. This may further obfuscate the reason for any particular query.

In some instances, applying a large number of filters may result in uniquely identifying a single client. As more filters are applied in a query, the number of results matching each query may diminish until data from only a single client is returned. This may result in a lack of privacy for the client, as the panel provider may track all content received by the client. Accordingly, in some implementations, upon determining that the number of results is below a predetermined threshold, the audience measurement server may refuse the query. In other implementations, the audience measurement server may calculate a hash of the requested client identifiers for each query, such that the query results may not be combined, and may provide the results of the queries separately to the panel provider. This allows the panel provider access to the measurement data, while preventing the panel provider from identifying and tracking any individuals.

One implementation disclosed herein is a method for online audience measurement via obscured characteristics. The method includes receiving, by an audience measurement server, from each of a plurality of client devices, a communication transmitted from said client device comprising an identification of an item of content received from a content provider and an identifier of said client device. The method also includes receiving, by the audience measurement server from a panel measurement service, a request for measurement data of panel members of said panel measurement service, the request comprising a first data array and a second data array. The method further includes comparing, by the audience measurement server, the received communications to the first data array to select a first subset of the received communications. The method also includes comparing, by the audience measurement server, the received communications to the second data array to select a second subset of the received communications. The method also includes selecting, by the audience measurement server, a third subset of the received communications comprising the intersection of the first subset and the second subset. The method further includes aggregating, by the audience measurement server, the identifications of the items of content from the selected third subset to generate an audience measurement of each item of content; and transmitting, by the audience measurement server to the panel measurement service, the generated measurement data.

In some implementations, the identifier of the client device in each received communication further comprises a first identifier of the client device provided by the panel measurement service, and a second identifier of the client device provided by a manufacturer of the client device. In a further implementation, the method includes identifying an intersection between a first identifier of a first client device and the first data array; and identifying an intersection between a second identifier of the first client device and the second data array. In another further implementation, the first identifier of the client device comprises a data array generated by the panel measurement service; and the method includes selecting a received communication for inclusion in the first subset, responsive to a non-zero intersection between the first identifier of the received communication and the first data array of the request.

In some implementations, the method includes determining, by the audience measurement server, that the third subset of the received communications includes a number of identifiers of client devices below a predetermined threshold. In a further implementation, the method includes removing, by the audience measurement server, identifiers of client devices from the generated measurement data prior to transmitting the generated measurement data, responsive to the determination. In another further implementation, the method includes hashing each identifier of a client device in the first subset of the received communications with a first hash function, and hashing each identifier of a client device in the second subset of the received communications with a second, different hash function, responsive to the determination; and transmitting the hashed identifiers of the client devices.

In some implementations, the first data array or second data array comprises a probabilistic data filter. In other implementations, the first data array or second data array comprises a bitmap.

In another aspect, the present disclosure is directed to a system for online audience measurement via obscured characteristics. The system includes a device, in communication with a plurality of client devices and a panel measurement server, executing an audience measurement server. The audience measurement server is configured for receiving, from each of a plurality of client devices, a communication transmitted from said client device comprising an identification of an item of content received from a content provider and an identifier of said client device. The audience measurement server is also configured for receiving, from the panel measurement service, a request for measurement data of panel members of said panel measurement service, the request comprising a first data array and a second data array. The audience measurement server is further configured for comparing the received communications to the first data array to select a first subset of the received communications; and comparing the received communications to the second data array to select a second subset of the received communications. The audience measurement server is also configured for selecting a third subset of the received communications comprising the intersection of the first subset and the second subset. The audience measurement server is further configured for aggregating the identifications of the items of content from the selected third subset to generate an audience measurement of each item of content; and transmitting, to the panel measurement service, the generated measurement data.

In some implementations, the identifier of the client device in each received communication further comprises a first identifier of the client device provided by the panel measurement service, and a second identifier of the client device provided by a manufacturer of the client device. In a further implementation, the audience measurement server is further configured for identifying an intersection between a first identifier of a first client device and the first data array, and identifying an intersection between a second identifier of the first client device and the second data array. In another further implementation, the first identifier of the client device comprises a data array generated by the panel measurement service; and the audience measurement server is further configured for selecting a received communication for inclusion in the first subset, responsive to a non-zero intersection between the first identifier of the received communication and the first data array of the request.

In some implementations, the audience measurement server is further configured for determining that the third subset of the received communications includes a number of identifiers of client devices below a predetermined threshold. In a further implementation, the audience measurement server is further configured for removing identifiers of client devices from the generated measurement data prior to transmitting the generated measurement data, responsive to the determination. In another further implementation, the audience measurement server is further configured for hashing each identifier of a client device in the first subset of the received communications with a first hash function, and hashing each identifier of a client device in the second subset of the received communications with a second, different hash function, responsive to the determination; and transmitting the hashed identifiers of the client devices.

In some implementations of the system, the first data array or second data array comprises a probabilistic data filter. In other implementations of the system, the first data array or second data array comprises a bitmap.

In still another aspect, the present disclosure is directed to a computer-readable storage medium storing instructions that when executed by one or more data processors, cause the one or more data processors to perform operations including receiving, from each of a plurality of client devices, a communication transmitted from said client device comprising an identification of an item of content received from a content provider and an identifier of said client device; and receiving, from a panel measurement service, a request for measurement data of panel members of said panel measurement service, the request comprising a first data array and a second data array. The operations further include comparing the received communications to the first data array to select a first subset of the received communications; and comparing the received communications to the second data array to select a second subset of the received communications. The operations also include selecting a third subset of the received communications comprising the intersection of the first subset and the second subset; aggregating the identifications of the items of content from the selected third subset to generate an audience measurement of each item of content; and transmitting, to the panel measurement service, the generated measurement data.

In some implementations, the operations include determining that the third subset of the received communications includes a number of identifiers of client devices below a predetermined threshold; and hashing each identifier of a client device in the first subset of the received communications with a first hash function, responsive to the determination. The operations also include hashing each identifier of a client device in the second subset of the received communications with a second, different hash function, responsive to the determination; and transmitting the hashed identifiers of the client devices.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1A:
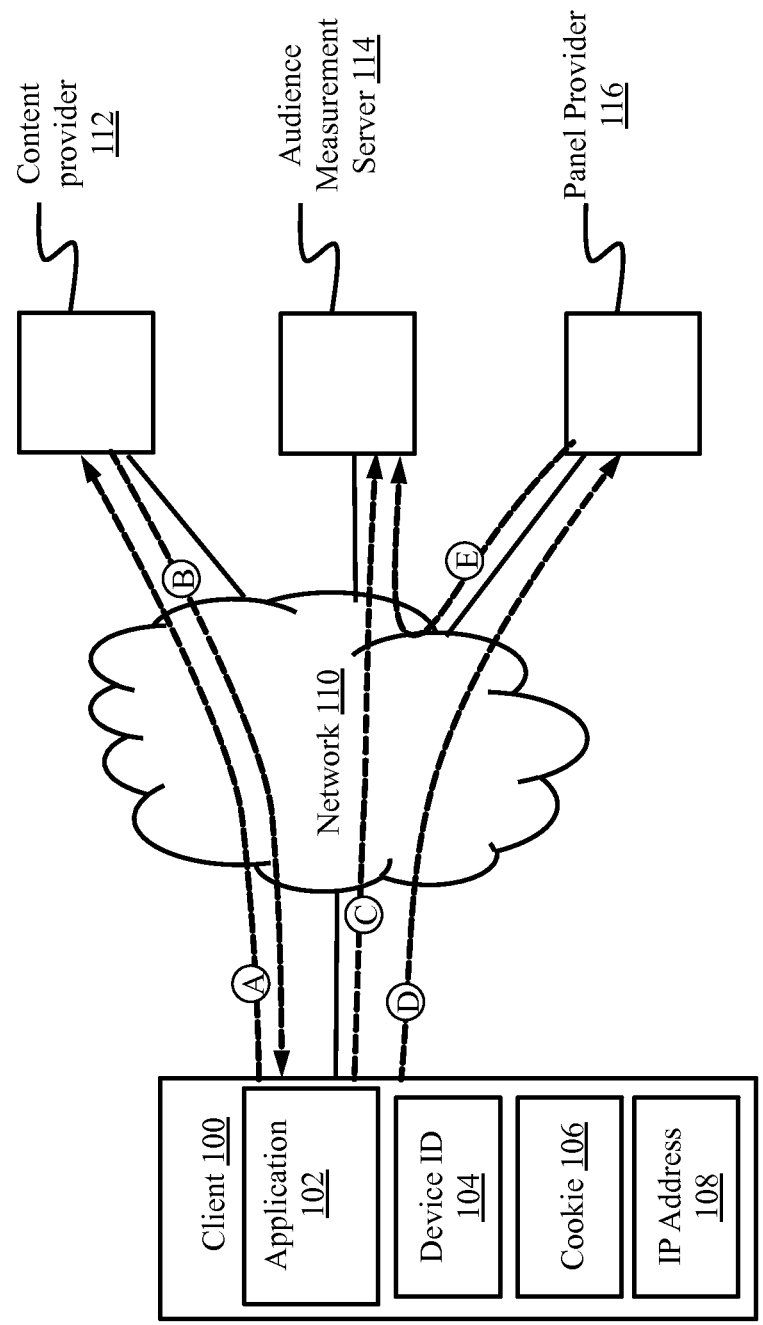
FIG. 1A is a diagram of a system for measurement of an audience of content provided by at least one content provider, according to one implementation.

Audience measurement data may include identifications of content received and displayed by a device. Such content may include audio, video, multimedia, text, animation, advertising, or other such data. Measurement of the audience of the content may be useful for measuring audience size or popularity of content for pricing and selling advertisement placements, planning content delivery schedules, or other such purposes. In traditional terrestrial or satellite broadcasting, a provider may not have direct knowledge of the number of receivers tuned in at any time, due to the lack of a back channel or communication pathway from the receiver to the provider. To overcome this limitation, audience measurement systems have used panels of participating individuals who agree to fill out surveys or diaries of content they've seen or listened to, or wear or carry a portable device that detects content played back in the vicinity and records a log for subsequent transmission to the panel provider.

Unlike typical broadcasters, Internet content providers may have direct knowledge of the number of recipient devices, via monitoring of destinations of outgoing packets, or by requesting return responses from each recipient device. However, as content delivery systems have become more complex, different items of content may be provided to a device by different providers. In one such instance, a website may be provided by a first web server, while an embedded video is provided by a separate content delivery network, and one or more banner advertisements or interstitial video advertisements are provided by one or more separate ad delivery networks. Accordingly, a single provider may actually only have knowledge of the number of recipients of content provided by said single provider, and thus may not be able to accurately measure overall audience numbers. This may be further complicated with content delivery networks with a large number of sources, in which different individual servers may be used to provide content to a device, e.g. for load balancing purposes.

In some implementations, an agent may be executed on the device, such as a web browser plug-in or packet interceptor, or may be executed on an intermediary device between the recipient device and the content providers, such as a router, WiFi access point, gateway, or other such device. In other implementations, content delivery and audiences may be measured by capturing lightweight communications or "pings" transmitted from a client device to an audience measurement server, without requiring execution of separate client-side agents. The ping may include a device identifier of the client device, such as a panel session identifier or a cookie, and an identification of the content. In some implementations, the ping may include an identification of content placement within a layout, such as position of a banner, identification of a frame, or other such indicators. The ping may be transmitted responsive to rendering of a webpage or other data, execution of an embedded script, or other such functions. In one implementation, the ping may be a Hypertext Transfer Protocol (HTTP) GET request for a one pixel image with parameter-value pairs to identify the device identifier and content displayed with or embedded in the page triggering the GET request or a separate HTTP request (such as in response to an A PING tag). In another implementation, the ping may be a request for the item of content and may be transmitted to the audience measurement server, said audience measurement server redirecting the request (e.g. via an HTTP 302 redirect or similar method), to the content provider.

Illustrated in FIG. 1A is a diagram of a system for measurement of an audience of content provided by at least one content provider 112, with aggregation of data provided by an audience measurement server 114, according to one implementation. An audience measurement server 114 may comprise one or more devices receiving content identifiers and/or device identifiers from a client 100, and providing the received content identifiers and/or device identifiers to a panel provider 116. Although illustrated in parallel with a panel provider 116 and content provider 112, in some implementations, an audience measurement server 114 may be deployed as an intermediary between one or both of panel provider 116 and content provider 112 and a client 100.

A client device 100 may communicate via a network 110 with one or more content providers 112 and a panel provider 116. A client device 100, referred to variously as a client, device, client device, computing device, user device, or any other such term, may be a desktop computer, laptop computer, tablet computer, smart phone, video game console, smart television or set top box, server, workstation, or any other type and form of computing device capable of communicating over a network 110. Although only one client device 100 is illustrated for clarity, in practice, a plurality of client devices 100 may communicate with each other and/or with content or panel providers 112-116.

In some implementations, a client device 100 may execute an application 102, which may be an application, service, server, daemon, routine, or other executable logic for communicating over a network 110, such as a web browser, mail client, video player, music player, video game, or any other such application. Application 110 may include a command line interface, graphical user interface, or any combination of these or other interfaces.

A client device 100 may include one or more client identifiers 104-108, including a device identifier 104, a cookie 106 provided by a panel provider 116, and/or an internet protocol (IP) address 108, referred to generally as client identifier(s). Such client identifiers may be fixed, updated periodically, updated on request, or updated at other intervals. Client identifiers 104, 106 may each be an alphanumeric string, data string, serial number, media access control (MAC) address, username or account name, globally unique identifier (GUID), cookie, random or pseudorandom number, or any other type and form of identifier, including combinations of these or other identifiers. As discussed above, a client identifier may be fixed to the device or preconfigured in the device, such as devices identifiers 104 of a manufacturer serial number or MAC address, while in other implementations, the client identifier may be dynamically set by a panel provider 116, application 102, or other entity. A cookie 106 may be a session cookie provided by a panel provider 116 responsive to a login by a the client 100 to a server of the panel provider 116. In some implementations, a unique or new client identifier may be set for each communication to a panel provider 116, while in other implementations, the client identifier may not be changed, or may be changed periodically (e.g. hourly, daily, weekly, etc.) or at other intervals (e.g. on restart of the client device 100, login to an internet service, etc.).

In some implementations, application 102 may include a capture agent (not illustrated), or the client device 100 may execute a capture agent (not illustrated). A capture agent may be a web browser plug-in or extension, packet sniffer or interceptor, screen scraper, text or data parser, monitor, application, service, daemon, routine, or other executable logic for identifying content provided to client device 100 and transmitting an identification of the content (and, in some implementations, a client identifier 104-108) to a panel provider 116 or other measurement service. As discussed above, in some implementations, a capture agent may be executed by an intermediary device (not illustrated) deployed between client 100 and network 110 and/or content provider(s) 112.

Client device 100 may communicate with content provider 116 and/or panel provider 112, or other client devices 100, servers, or devices via a network 110. Network 110 may be any form of computer network or combinations of networks that relay information between client devices 100, one or more content providers 116, and one or more panel providers 112, as well as other devices not illustrated. A network 110 may include the Internet and/or other types of data networks, such as a local area network (LAN), a wide area network (WAN), a cellular network, satellite network, or other types of data networks. Network 110 may also include any number of computing devices (e.g., computer, servers, routers, network switches, etc.) that are configured to receive and/or transmit data within network 110. Network 110 may further include any number of hardwired and/or wireless connections. A client device 100 may communicate wirelessly (e.g., via WiFi, cellular, radio, etc.) with a transceiver that is hardwired (e.g., via a fiber optic cable, a CAT5 cable, etc.) to other computing devices in network 110. In some implementations, a network 110 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.).

A content provider 112 may include one or more computing devices connected to network 110 and configured for providing content to a client 100. Content provider 112 may be referred to variously as a content provider, server, web server, data server, publisher, service provider, or by other similar terms. In many implementations, content provider 112 may include a plurality of computing devices configured as a server farm or cloud, and may include routers, load balancers, network address translators, firewalls, or other such devices. Content providers 112 may be computer servers (e.g., FTP servers, file sharing servers, web servers, etc.) or combinations of servers (e.g., data centers, cloud computing platforms, etc.). Content providers 112 may provide any type and form of content, including text, images, video, audio, multimedia, or other data, or any combination of these. Content may include search results, blog or forum content, news articles, movies, television shows, podcasts, video games or other interactive content, advertising in any format, websites, social media, or any other type and form of content. Content provider 112 may be an online search engine that provides search result data to client device 100 in response to a search query. In another example, content provider 112 may be a first-party web server that provides webpage data to client device 100 in response to a request for the webpage. In still another example, content provider 112 may be a video streaming service that streams television shows or movies, along with interstitial video advertisements, banner advertisements, pre-roll or post-roll advertisements, or other such content, to a client 100 or provides insertion points for such advertisements or other such content to cause the client 100 to request the content from one or more other content providers.

According to various implementations, a content provider 112 may provide first-party webpage data to client devices 100 that includes one or more content tags. In general, a content tag refers to any piece of webpage code associated with the action of including third-party content with a first-party webpage. A content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., another content provider 112, panel provider 116, etc.), a network location (e.g., a URL) associated with clicking on the third-party content, how the third-party content is to be rendered on a display, a command that causes client device 100 to set a browser cookie (e.g., via a pixel tag that sets a cookie via an image request), one or more keywords used to retrieve the third-party content, and other functions associated with providing third-party content with a first-party webpage. Content provider 112 may serve first-party webpage data to a client device 100 that causes the client device 100 to send a request to a panel provider 116.

An audience measurement server 114 may include one or more computing devices connected to network 110 and configured for receiving content identifiers and device identifiers from one or more clients 100 for analysis or audience measurement. Audience measurement server 114 may further be configured for receiving one or more queries from a panel provider 116, selecting and aggregating content identifiers and device identifiers, and providing measurement data to the panel provider.

A panel provider 116 may include one or more computing devices connected to network 110 and configured for receiving content identifiers from one or more clients 100 for analysis or audience measurement. Panel provider 116 may be referred to variously as a surveyor, measurement system, server, data server, service provider, or by other similar terms. Panel provider 116 may be a plurality of devices configured in a server farm or server cloud for distributed processing, and may provide other functions. In one implementation, panel provider 116 may be an intermediary between one or more content providers 112 and clients 100, while in other implementations, panel provider 116 may communicate with content providers 112 via network 110.

In one implementation of audience measurement via client devices of panel members illustrated in the example signal flow of FIG. 1A, at step A, a client device 100 may transmit a request for content to a content provider 112. The request may be in any form or protocol, such as a Hypertext Transport Protocol (HTTP) GET request for a news article or other content at a web page. In other implementations, the request may be for a streamed video, such as a television show or movie. At step B, the content provider 112 may transmit the content to the client 100.

At step C, the client device 100 or application 102 may identify the transmitted content and transmit a content identifier and one or more client identifiers 104-108 to an audience measurement server 114 for storage and aggregation. The content identifier may include a uniform resource locator (URL), a uniform resource identifier (URI), an alphanumeric string, a file name, an alternate identifier (alt ID), or any other such information. In some implementations, the content identifier may include a placement of the content on a page (e.g. in an upper frame, a lower frame) or an identification of a position of the content within a hierarchy of the page (e.g. a child of an embedded element of the page). The client device 100 and/or application 102 may transmit the content identifier and/or client identifiers responsive to a command included in the received content, such as a IMG tag in an HTTP document that causes a web browser 102 to request the corresponding image from the audience measurement server 114, in some implementations. Such images may be a one pixel by one pixel image or a transparent image, to avoid any visual artifacts being displayed by client 100 upon receipt of the image. The content identifier may be a portion of a URL of the image, or a parameter of the URL transmitted in the request to the server. In one such implementation, a different URL may be included in the page for each item of content transmitted to the client (e.g. "http://www.example.com/img/content_id_001.jpg" to identify a predetermined first item of content), while in another such implementation, the content may be identified as a parameter (e.g. "http://www.example.com/img/content.jpg?id=001"). Still other methods of transmitting the content identifier to the audience measurement server may be used. In some implementations, an embedded tag or link to the content may include an HTML PING tag that causes application 102 to transmit a first request for the document or content identified by a URL in the tag, and to transmit a second communication to a URL specified by the PING tag (e.g. the audience measurement server 114). In still another implementation, the application 102 may request the content at a URL of the audience measurement server 114, which may store an identification of the requested content, and respond with an HTTP redirection (e.g. status code 302, or a HTTP refresh header specifying a different URL) identifying the URL of the requested content at the content provider 108. In some implementations, the application 102 may include client identifiers as cookies or options within the HTTP GET request.

At step D, in some implementations, the client 100 may transmit the content identifier and/or client identifiers to panel provider 110. In other implementations, such as where a client does not execute a capture agent provided by the panel provider, step D may be skipped. Data from clients not executing a capture agent may subsequently be obtained by the panel provider from the audience measurement server 114. This data may be aggregated with other data from devices associated with an individual. In one such implementation, the panel provider 110 may directly receive content identifiers and client identifiers from a laptop of a panel member, and may receive content identifiers and client identifiers from a smart television of the panel member via the audience measurement server. Accordingly, cross-media data aggregation may be possible, even though the data may be obtained from different sources.

At step E, the panel provider 116 may transmit a request for measurement data to the audience measurement server 114. In some implementations, the request may include a set of one or more client identifiers to retrieve data for, and/or may include a set of one or more content identifiers to retrieve data for. The request may include a list of client identifiers and the audience measurement server 114 may respond with an aggregated set of content identifiers for content received by the corresponding clients. In another example, the request may include a set of content identifiers, and the audience measurement server 114 may respond with an aggregated set of client identifiers that received the corresponding content. In still another example, the request may include a set of content identifiers, and the audience measurement server 114 may respond with other content identifiers corresponding to content received by clients that also received the content corresponding to the content identifiers of the request. In such an implementation, the panel provider 116 may request measurement data for all clients that visited a particular website.

In the implementation shown in FIG. 1A, the client 100 transmits content and client identifiers to the audience measurement server 114 directly at step C. In other implementations, a client 100 may transmit content and client identifiers to the panel provider 116 (as at step D), and the panel provider 116 may forward the identifiers to the audience measurement server 114 or redirect the client 100 to retransmit the identifiers to the audience measurement server 114. In one such implementation, the panel provider 116 may provide an HTTP 302 redirection response to the client 100 indicating that the client 100 should retransmit a request including a content and/or client identifier to the audience measurement server 114.

In many implementations of single-source panel measurement, panel providers 116 require users or devices to authenticate or log in with the panel provider, such as via a user name or account name or password or other authentication system. This may be done to allow tracking of content displayed to a specific user or transmitted to a device over time, such as over a multi-session, multi-day, multi-week, or other such period. In some implementations, authentication may be handled via a browser plug-in or collection agent as discussed above. In other implementations, authentication may be handled via logging in to a service of the panel provider, and the panel provider may transmit a session identifier or cookie to the device. The session identifier or cookie may be set to expire after a predetermined amount of time, or upon ending the session (e.g. terminating execution of a web browser or application, restarting a computing device or putting the device to sleep, etc.).

To allow identification and measurement of content received by specific panel members during a session or other period without requiring a collection agent, in some implementations, panel providers may register users with the audience measurement server by having the client device first log in to the panel provider and receive a session identifier, and then having the client device transmit the session identifier to the audience measurement server. The audience measurement server may transmit a cookie or device identifier to the device to use when transmitting content identifiers. A client device 100 may log in, register, or otherwise authenticate itself to a panel provider 116. The panel provider 116 may transmit a session identifier to the client device, such as within a redirection message to a specified URL (e.g. http://www.example.com/register?CookieID=xxxxx). The client device 100 may transmit the session identifier to the audience measurement server 114, and the audience measurement server 114 may generate another cookie or client identifier corresponding to the session identifier, and transmit the cookie or client identifier to the client 100, for future transmission with content identifiers. The audience measurement server 114 may maintain a record of session identifiers and associated cookies or device identifiers, such that when the audience measurement server provides content identifiers to the panel provider 116 for aggregation or analysis, the content identifiers may be identified with the session identifier and, accordingly, the panel member.

In a similar implementation, to improve confidentiality of the panel, session identifiers may not be provided to the audience measurement server 114; rather, the device 100 may simply request a client identifier or cookie from the audience measurement server 114. Upon receipt of the client identifier or cookie, in some implementations, the client device 100 may transmit the client identifier or cookie to the panel provider 116. The panel provider 116 may associate the device identifier or cookie with the session identifier sent to the client device 100 or a generated session identifier. Upon subsequent receipt of content identifiers and device identifiers or cookies, the panel provider 116 may utilize the stored association to identify which content identifiers correspond to which devices 100.

In a similar implementation not illustrated, an intermediary device deployed between client device 100 and network 110 may handle registration with the panel provider 116 and transmission, receipt, or request of session identifiers, device identifiers, or cookies. Such intermediary devices, such as routers or gateways, may be used to measure content delivered to a panel household or group of users, rather than individual users or devices. This may be done to both reduce complexity of the system (avoiding installing collection agents on a plurality of devices) and to increase individual privacy for panel participants.

Figure 1B:
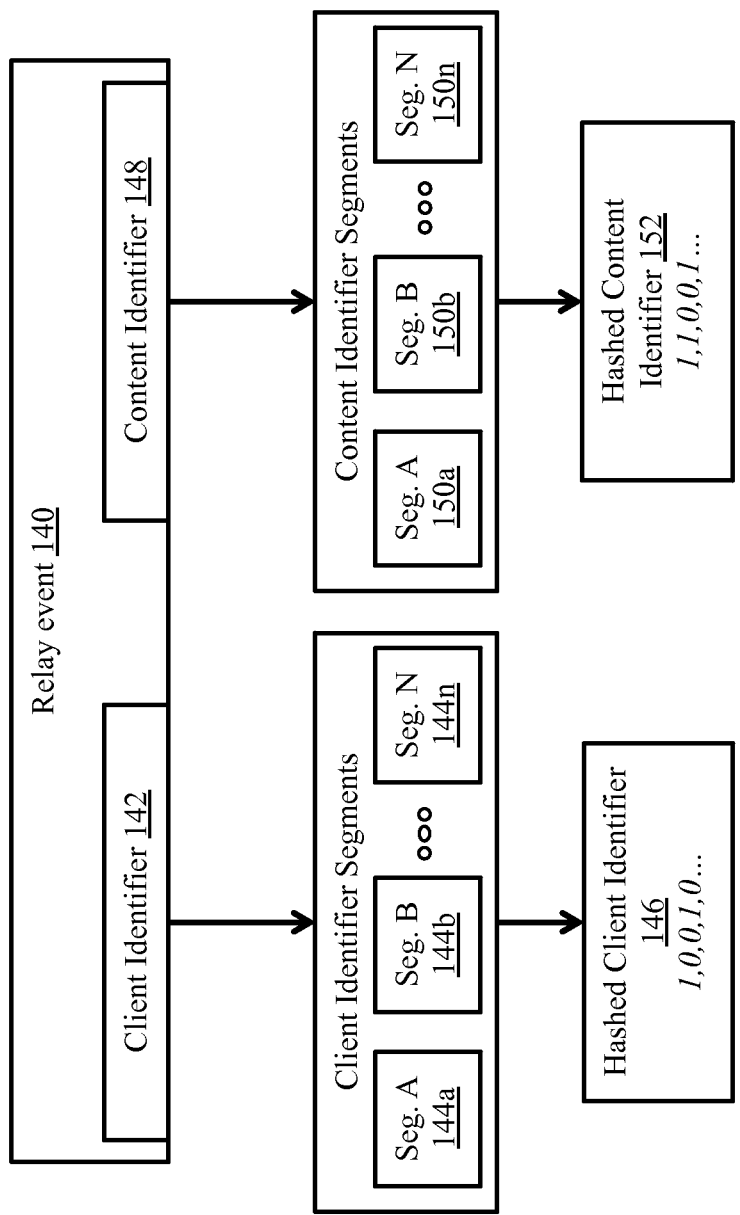
FIG. 1B is a diagram of an event log including client identifiers and content identifiers, according to one implementation.

FIG. 1B is a diagram of an event 140 including client identifiers 142 and content identifiers 148, according to one implementation. The event 140 may be transmitted by a client 100 to an audience measurement server 114 via any of the methods discussed above. The event 140 may be transmitted as one or more parameter-value pairs in a request, such as an HTTP GET request. The client identifier 142 may include a plurality of client identifier segments 144a-144n. In some implementations, such as where the client identifier 142 comprises a cookie provided by a panel provider, each segment 144a-144n may represent a characteristic or trait of the client and/or a panel member, such as demographic or device information. A first segment 144a may represent gender of a panel member, and a bit or string of the first segment 144a may be set to a predetermined value to indicate the gender of the panel member. Similarly, a second segment 144b may represent a predetermined age group. In many implementations, the meaning of each segment 144a-144n may not be provided to the audience measurement server, such that the audience measurement service may not be able to determine the characteristics of the panel member or device, despite receiving the client identifier 142.

In a further implementation, the panel provider may calculate a hash of the client identifier segments 144a-144n and may provide the hash result 146 to the client 100 to use as a cookie. The panel provider may learn demographic information about each panel participant during enrollment of the participant in the panel. The panel provider may generate an identifier comprising a plurality of segments 144a-144n, each indicating a particular characteristic of the panel participant. The panel provider may calculate a hash of the identifier and may provide the hash result to the client for transmission to the audience measurement server with content identifiers. By using a hash calculation on the segments 144a-144n, panel participants with similar but not identical demographic characteristics may have very different hash results 146, such that the audience measurement server may not be able to identify whether the participants have any traits in common. In a similar implementation, the audience measurement server may calculate the hash of segments 144a-144n and use the hash result 146 for comparison to a data array (such as a bitmap or Bloom filter) in a query provided by a panel provider.

Event logs 140 may include a content identifier 148 or identification of an item of content as discussed above. Such identifiers may include different information, such as an IP address of a source of the content, a name of the content, metadata of the content, a type of content, etc. In some implementations, this different information may be represented by a plurality of segments 150a-150n or may be encoded as a plurality of segments 150-a-150n by an audience measurement server, content provider, and/or panel provider. In a further implementation, as discussed above, a hash may be calculated of the segments 150a-150n to generate a hashed content identifier 152. This may be used to obscure the content and/or provide faster retrieval or comparison to query filters.

Figure 1C:
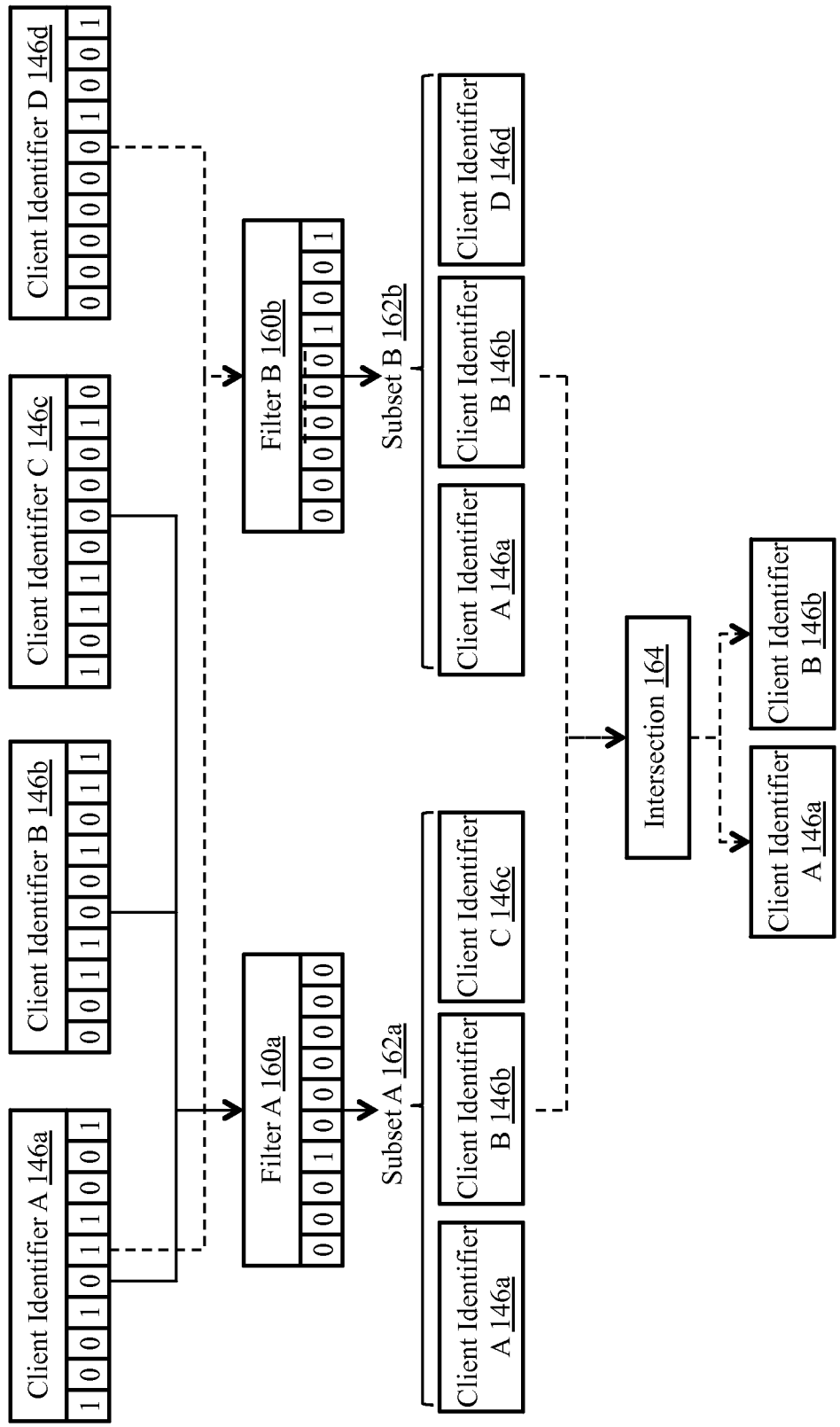
FIG. 1C is a diagram illustrating obfuscated queries of client identifiers, according to one implementation.

FIG. 1C is a diagram illustrating one such obfuscated query, according to one implementation, that prevents the audience measurement server from identifying demographic characteristics or traits of individual clients. As show, a plurality of hashed client identifiers 146a-146d may be provided to the audience measurement server. As discussed above, these identifiers may be included in cookies received from corresponding clients 100a-100d sent via redirections or pings, or may be sent by the panel provider to the audience measurement server during registration of a client and associated with other client identifiers (e.g. device identifiers, IP addresses, etc.). In the example shown, client A and client B may share a first demographic trait or characteristic, while client C and client D may not share the trait. However, once hashed to create a unique identifier 146a-146d, it may not be readily apparent from the identifiers alone that client A and B share the trait.

To query measurement data for the first characteristic, the panel provider may transmit a request for measurement data, the request including one or more data arrays or filters 160a-160b. In one implementation, the identifiers 146a-146d may be stored as bitmaps and filters 160a-160b may comprise masks or bitmaps to be used in a logical biconditional calculation (e.g. an identifier is included if and only if it includes all of the on bits of the filter). In a similar implementation, filters 160a-160b may comprise Bloom filters or probabilistic data arrays used for the logical biconditional calculation.

In the example illustrated, filter A 160a includes a first bit that matches a corresponding bit in client identifiers A-C 146a-146c, and is used to generate a first subset of client identifiers A 162a. Similarly, filter B 160b includes two bits that match two corresponding bits in client identifiers A-B and D 146a-146b, 146d, and is used to generate a second subset of client identifiers B 162b. The audience measurement server may then determine an intersection 164 of subset a 162a and subset b 162b, and select the resulting client identifiers A-B 146a-146b. Measurement data for these selected identifiers may be retrieved and provided to the panel provider.

Accordingly, by obfuscating characteristics of each client identifier via a hash, and providing a plurality of filters that together identify only the desired clients, a panel provider may retrieve data without informing the audience measurement server of the characteristics of clients or what any particular query is for.

Figure 1D:
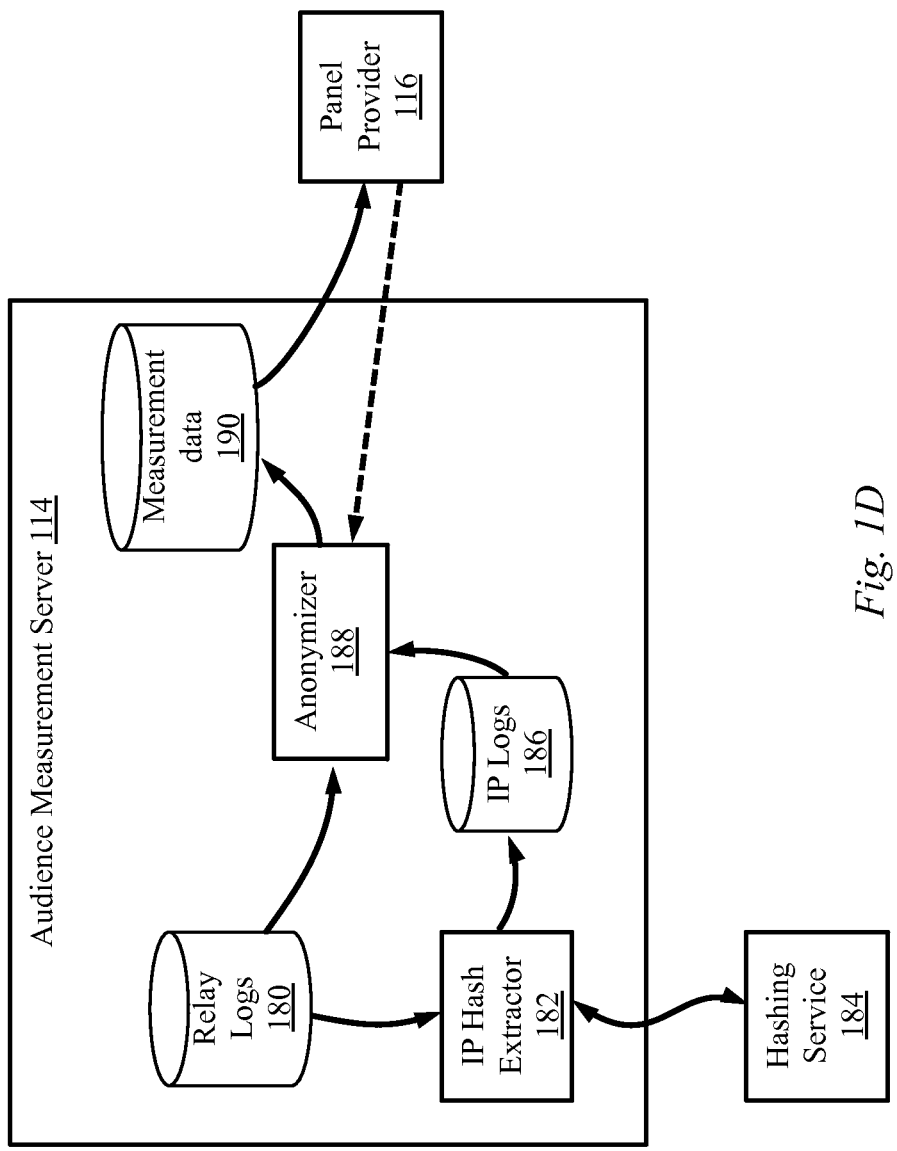
FIG. 1D is a block diagram of a system for measurement of an audience of content provided by at least one content provider via an audience measurement server, according to one implementation.

FIG. 1D is a block diagram of an audience measurement server 114 in communication with a panel provider for aggregating and anonymizing measurement data, according to one implementation. As shown, a measurement server 114 may store one or more relay logs 180, which may comprise a plurality of event logs 140 as discussed above in connection with FIG. 1B. Logs 180 may be stored in any type and form of database, flat file, data file, or other structure, and may be stored on one or more storage devices internal to and/or external to but in communication with the audience measurement server 114.

In some implementations, the audience measurement server 114 may include an IP hash extractor 182. IP hash extractor 182 may comprise an application, service, daemon, routine, or other executable logic for extracting an IP address from a client event ping or log and for transmitting the address as a query to a hashing service 184, such as a hashing service provided by a content provider. In some implementations, a content provider may maintain an identifier of a client to which content has been delivered. Such identifiers may be associated with an IP address, such as an identifier generated from a hash calculation of an IP address. In such implementations, the audience measurement server 114 may transmit an IP address from a ping or redirected request received from a client 100 to the hashing service 184 and receive an identifier associated with the client generated by the hashing service and/or content provider. The association of the client IP address to the hashed identifier from the hashing server 184 may be stored in an IP log 186, in some implementations. IP log 186 may be stored as a separate database from event logs 180, or may be stored in the same database and, in some implementations, associated with the corresponding client identifiers.

In some implementations, an audience measurement server 114 may include an anonymizer 188. Anonymizer 188, discussed in more detail below, may comprise an application, server, service, daemon, routine, or other executable logic for applying data arrays in requests (dashed line) received from a panel provider 116 to relay logs 180 and/or IP logs 186 to generate aggregated measurement data 190 to be provided to the panel provider 116. Anonymizer 188 may, in some implementations, anonymize the data by merging event logs into aggregated event logs (e.g. replacing a plurality individual logs identifying an item of content and different client identifiers with a single log identifying the item of content and a count of the number of unique client identifiers; replacing explicit identifiers of items of content such as names of the content with a generic term, such as a type of the content or source of the content; etc.). In some implementations, discussed in more detail below, an anonymizer 188 may determine, based on the number of results to a query, whether a panel participant or individual may be uniquely identified, and responsive to the determination, provide an anonymized version of the data, such as data with client identifiers replaced with different hashes calculated for each query.

Figure 2A:
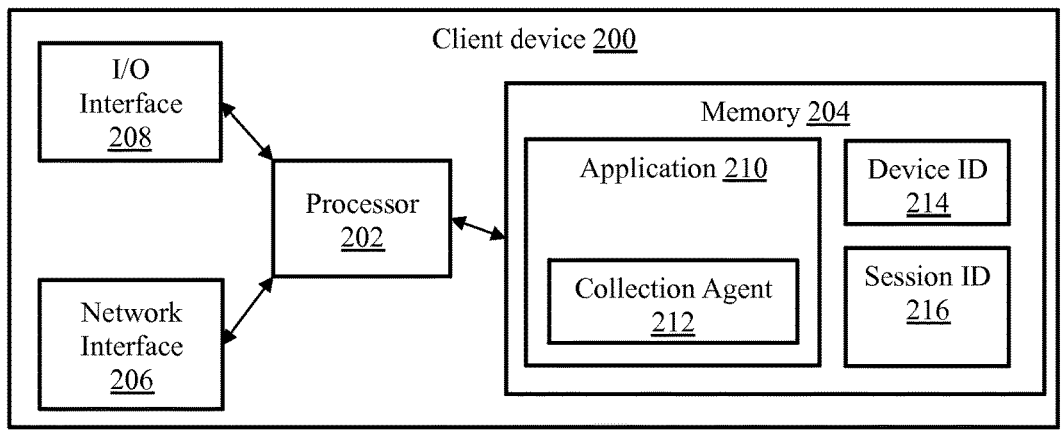
FIG. 2A is a block diagram of a client device, according to one implementation.

Illustrated in FIG. 2A is a block diagram of one implementation of a computing device 200 of a client, panel participant, or non-panel participant, such as client devices 100. Client device 200 may be any number of different types of user electronic devices configured to communicate via network 106, including without limitation, a laptop computer, a desktop computer, a tablet computer, a smartphone, a digital video recorder, a set-top box for a television, a video game console, or any other type and form of computing device or combinations of devices. In some implementations, the type of client device 200 may be categorized as a mobile device, a desktop device or a device intended to remain stationary or configured to primarily access network 106 via a local area network, or another category of electronic devices such as a media consumption device.

In many implementations, client device 200 includes a processor 202 and a memory 204. Memory 204 may store machine instructions that, when executed by processor 202 cause processor 202 to perform one or more of the operations described herein. Processor 202 may include a microprocessor, ASIC, FPGA, etc., or combinations thereof. In many implementations, processor 202 may be a multi-core processor or an array of processors. Memory 202 may include, but is not limited to, electronic, optical, magnetic, or any other storage devices capable of providing processor 202 with program instructions. Memory 202 may include a floppy disk, CD-ROM, DVD, magnetic disk, memory chip, ROM, RAM, EEPROM, EPROM, flash memory, optical media, or any other suitable memory from which processor 202 can read instructions. The instructions may include code from any suitable computer programming language such as, but not limited to, C, C++, C#, Java, JavaScript, Perl, HTML, XML, Python and Visual Basic.

Client device 200 may include one or more network interfaces 206. A network interface 206 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network 106. In many implementations, client device 200 may include a plurality of network interfaces 206 of different types, allowing for connections to a variety of networks 106 or a network 106 such as the Internet via different sub-networks.

Client device 200 may include one or more user interface devices 208. A user interface device 208 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 200, such as a built-in display, touch screen, microphone, etc., or external to the housing of client device 200, such as a monitor connected to client device 200, a speaker connected to client device 200, etc., according to various implementations.

Client device 200 may include in memory 204 an application 210 or may execute an application 210 with a processor 202. Application 210 may be an application, applet, script, service, daemon, routine, or other executable logic for receiving content and for transmitting responses, commands, or other data. In one implementation, application 210 may be a web browser, while in another implementation, application 210 may be a video game. Application 210 may include functionality for displaying content received via network interface 206 and/or generated locally by processor 202, and for transmitting interactions received via a user interface device 208, such as requests for websites, selections of survey response options, input text strings, etc.

In some implementations, application 210 may include a data collector 212. A data collector 212 may include an application plug-in, application extension, subroutine, browser toolbar, daemon, or other executable logic for collecting data processed by application 210. In other implementations, a data collector 212 may be a separate application, service, daemon, routine, or other executable logic separate from application 210 but configured for intercepting and/or collecting data processed by application 210, such as a screen scraper, packet interceptor, API hooking process, or other such application. Data collector 212 may be configured for intercepting or receiving data input via user interface device 208, such as Internet search queries, text strings, survey response selections, or other values, or data received and processed by application 210 including websites visited, time spent interacting with a website or application, pages read, or other such data. In many implementations, data collector 212 may store some or all of this data or identifiers of such data in a behavior history database or other data structure, and may include identifications of websites visited, web links followed, search queries entered, or other such data. In some implementations, the data may be anonymized or disambiguated to reduce personally identifiable information. Rather than recording individual search queries entered, such as a query for "vacation spots in France", a data collector 212 may identify predetermined categories corresponding to the search queries, such as "European tourism" or "travel" and record an indication of a search relating to the predetermined category. In other implementations, a data collector 212 may identify streamed multimedia content received by a client device, such as a television show, movie, song, music video, or other such content. Content may be identified based on identifier tags including ID3 tags or other such metadata, uniform resource locators (URLs) or uniform resource identifiers (URIs), filenames, or any other type and form of data accompanying the content. In other implementations, the data collector 212 may be executed by a server, or by an intermediary device deployed between the client and server, such as a router, cable modem, or other such device. Data requests and responses may be parsed by a data collector 212 executing on an intermediary router as the requests and responses traverse the router. In some implementations, this may allow for monitoring of all data flow to/from a household, without requiring installation of the data collector 212 on a plurality of devices within the household.

Client 200 may include or be identified with a device identifier 214. Device identifier 214 may include any type and form of identification, including without limitation a MAC address, text and/or numerical data string, a username, a cryptographic public key, cookies, device serial numbers, user profile data, network addresses, or any other such identifier that may be used to distinguish the client 200 from other clients 200. In some implementations, a device identifier 214 may be associated with one or more other device identifiers 214 (e.g., a device identifier for a mobile device, a device identifier for a home computer, etc.). In many implementations, as discussed above, a device identifier 214 may be generated and/or transmitted to the device 200 by a panel provider or audience measurement server, and may be transmitted responsive to a request or successfully logging in, registering, or authenticating with the panel provider. Accordingly, in some implementations, client 200 may include a session identifier 216 generated by a panel provider. In other implementations, as discussed above, client 200 may request a device identifier or cookie 214 from an audience measurement server, and may transmit the device identifier or cookie 214 to a panel provider for association with the device and/or a session identifier. In some such implementations, the session identifier may be stored or maintained by the panel provider and not provided to the device.

Figure 2B:
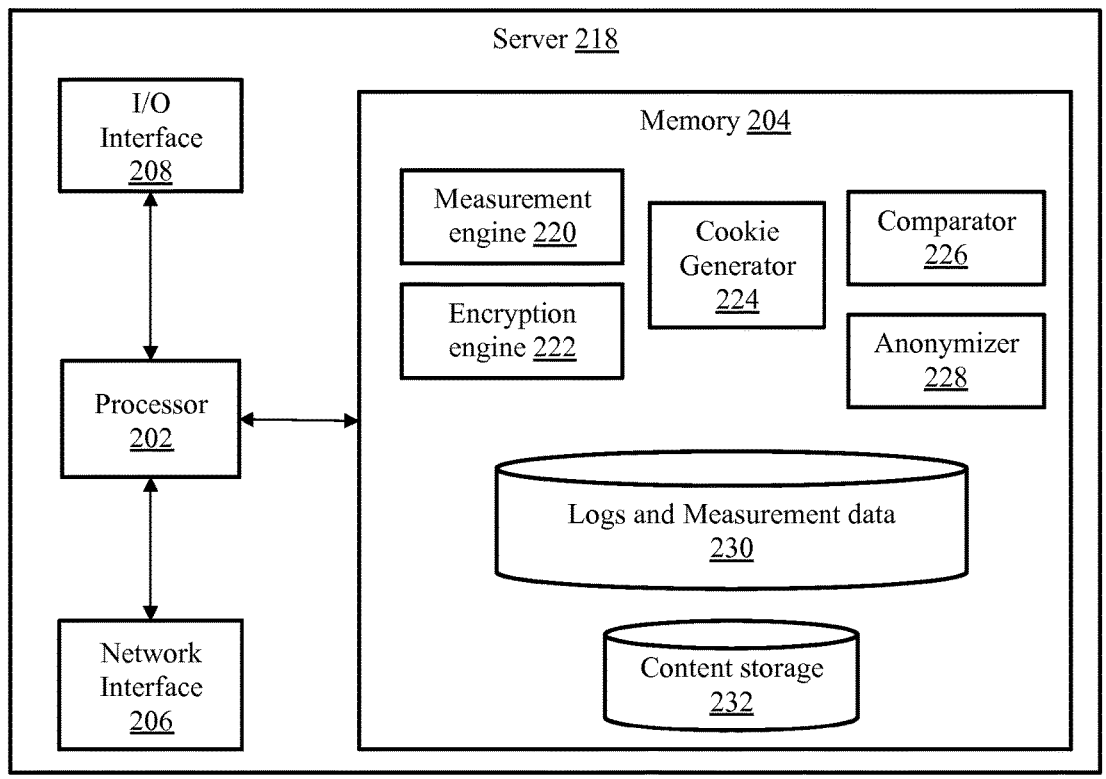
FIG. 2B is a block diagram of a server device, according to one implementation.

Referring now to FIG. 2B, illustrated is a block diagram of an implementation of a computing device or server 218, such as an audience measurement server 114, content provider 108, or panel provider 110, as discussed above in connection with FIG. 1A. As with client devices 200, server 218 may include one or more processors 202, memories 204, network interfaces 206, and user interfaces 208. In some implementations referred to as headless servers, a server 218 may not include a user interface 208, but may communicate with clients 200 with user interfaces 208 via a network 106. Memory 204 may include content storage 232, such as storage of webpages, images, audio files, video files, data files, or any other type and form of data. In some implementations, memory 204 may store one or more applications 210 (not illustrated) for execution by processor 202 of the server 218, including FTP servers, web servers, mail servers, file sharing servers, peer to peer servers, or other such applications for delivering content stored in content storage 232.

In some implementations, a server 218 may execute a measurement engine 220. Measurement engine 220 may comprise an application, service, server, daemon, routine, or other executable logic for measuring an audience of an item of content, including receiving content identifiers and/or device identifiers, aggregating or sorting content identifiers according to a device identifier, and measuring an audience for an item of content during a time period. A measurement engine may count the number of content identifiers identifying a particular item of content received over a period of time, such as an hour, associated with distinct device identifiers, to count a size of an audience that received the item of content. This audience measurement may be provided to content providers, advertising providers, marketers, publishers, analysts, or others.

In some implementations, server 218 may execute an encryption engine 222, sometimes referred to as a decryption engine or an encryption/decryption engine, depending on usage. An encryption engine 222 may comprise an application, service, routine, server, daemon, or other executable logic for encrypting data. In some implementations, an encryption engine 222 may comprise or interact with encryption hardware. Encryption engine 222 may perform any type of encryption and/or decryption algorithm, including any variety of the advanced encryption standard (AES) algorithm, the secure hash algorithm (SHA), or any other type of symmetric encryption. In other implementations, encryption engine 222 may perform any other type of encryption and/or decryption, including asymmetric encryption schemes, public key cryptography methods, cryptographic hashing functions, or any other type and form of cipher or cryptography.

In some implementations, a server 218 may execute a cookie and/or filter generator 224, referred to variously as a filter generator, filter module, filter, or other such names. In some implementations, a cookie generator 224 may calculate a hash for a client identifier and may provide the hash result to a client and/or audience measurement server for association with measurement data of the client. As discussed above in connection with FIGS. 1B-1C, the hashed client identifier or cookie may be provided to the audience measurement server during registration of a client and/or with relay or redirected pings from the client. In some implementations, a filter generator 224 may generate a data array, such as a bitmap, or a probabilistic data structure identifying hashed client identifiers for use in constructing queries. Such structures may include Bloom filter arrays or quotient filter arrays, or any other type and form of probabilistic data structure, as discussed above. In many implementations, the filter array or data structure may be applied by a comparator 226 to extract data from a measurement database, such as content and device identifiers, to generate a subset of the data corresponding to the device identifiers used to generate the probabilistic data structure. In many implementations, the filter may also extract some portion of the remaining data responsive to a number of false positives resulting from application of the filter to client identifiers for which data is not requested. As discussed above, in such implementations, multiple filters may be applied, with the intersection of the filter results provided to the panel provider. Accordingly, even though client identifiers may be falsely selected for a subset selection, the false positives may be removed during intersection of the filter results. Thus, the audience measurement server may provide a set of data to a panel provider, without being able to identify which client identifiers correspond to which characteristics.

Comparator 226 may comprise an application, service, server, daemon, or other executable logic for comparing one or more client identifiers or hashed client identifiers to a filter or data array, and, in some implementations, for calculating an intersection of a plurality of filters. In one implementation, comparator 226 may determine whether a client identifier meets a logical biconditional specified by a filter. In some implementations, comparator 226 may determine a plurality of subsets and then select an intersection of the subsets, while in other implementations, comparator 226 may apply a first filter to select a first subset; and then apply a second filter to the first subset to select a second subset of the first subset. This may reduce the need to store a plurality of subsets in memory. However, in other implementations, the subsets may be separately generated so that the audience measurement server may determine whether any subset has a fewer number of members than a predetermined threshold, indicating that additional steps should be taken by an anonymizer 228 to preserve anonymity.

Anonymizer 228 may comprise an application, service, server, daemon, or other executable logic for determining whether one or more anonymizations should be applied to data prior to providing the data to a panel provider, and for applying such anonymizations. As discussed above, in some implementations, if the panel provider provides a query with a large number of filters, a unique client identifier may be generated via intersection of the filter results, allowing the panel provider to retrieve a measurement of all content viewed by a specific client. This may be overly intrusive of privacy. Accordingly, in many implementations, anonymizer 228 may determine whether the number of client identifiers in the intersected results and/or subsets are below a predetermined threshold. If so, in one implementation, anonymizer 228 may respond to the panel provider's request with an indication that results could not be retrieved to protect the privacy of the individuals. In another implementation, anonymizer 228 may remove the client identifier(s) from aggregated measurement data before providing the measurement data to the panel provider. The anonymizer 228 may provide measurement data indicating that a number of clients viewed a particular item of content, without providing any specific client identifiers. In still another implementation, anonymizer 228 may calculate a hash of each client identifier selected for a subset responsive to a filter, and provide the hashed client identifiers for each subset to the panel provider, rather than determining an intersection of the filter results. If a first filter causes the audience measurement server to select five client identifiers, and a second filter causes the audience measurement server to select three client identifiers, and the resulting intersection of filter results is less than a threshold, the anonymizer 228 may calculate hashes of each of the eight client identifiers and provide the hash results for each subset to the provider. The results may be provided separately or combined, and without determining an intersection. In many implementations, the anonymizer 228 may use a different hash calculation or salt for each subset, such that the panel provider may not be able to identify matching client identifiers in each returned subset. Different salt or hash calculations may be used for each query, preventing the panel provider from repeating queries in order to uniquely identify a client.

In some implementations, a server 218 may maintain a log and measurement database 230. A log and measurement database 230 may comprise any type and form of database, flat file, data file, data array, or other data structure, for storing a plurality of content identifiers with corresponding client identifiers, device identifiers, cookies, IP addresses, hashed addresses, and/or session identifiers. In many implementations, a log and measurement database 230 may also include a timestamp of received or transmitted content identifiers. In some implementations, a log and measurement database may further include account information of a panel member, including user or account names, login passwords or other credentials, device types, or other parameters (e.g. operating system, web browser type or other application type, network connection type or speed, geographic location, etc.). Although shown as part of server 218, the measurement database may be stored on one or more internal and/or external storage devices, including network accessible storage.

As discussed above, in many implementations, a panel member may register or log in to a panel provider when beginning a session of interaction with online content. Some panel providers provide incentives to users for participation in a single-source panel, such as coupons or discounts on products, free services, or other such enticements. Accordingly, panel members may sign up or opt-in to participate in data collection. To protect privacy of participants, data collection may be limited or anonymized in many implementations. To track participation, the panel providers may provide a client agent to be executed on the client device, such as a web browser plug-in or application, or the client device may log in or register a session with the panel. In some implementations, the session may be time limited and expire automatically after a predetermined time, while in other implementations, the client device may transmit a first communication to initiate a session and a second communication to terminate the session.

Figure 3:
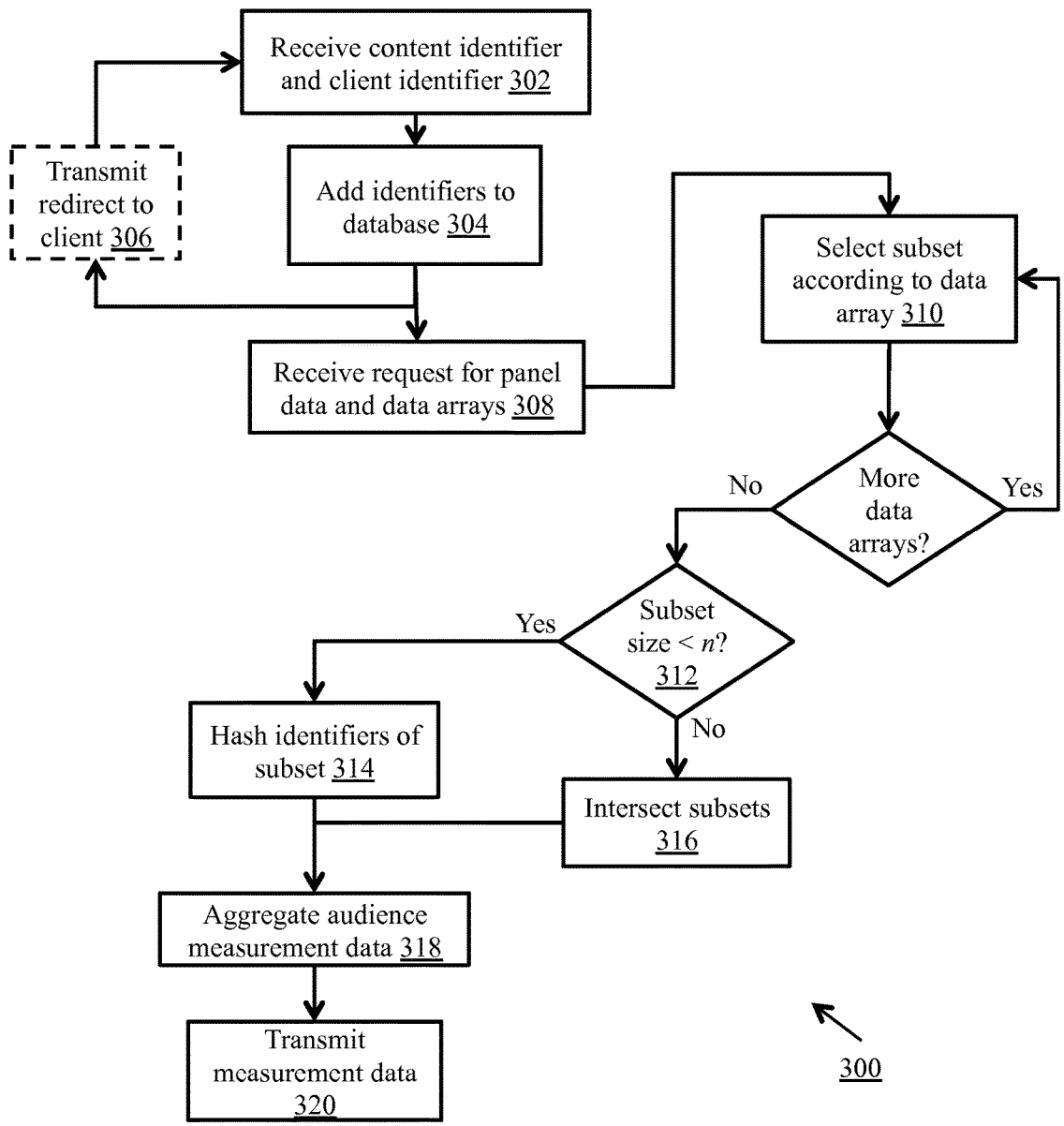
FIG. 3 is a flow diagram of the steps taken in one implementation of a process for obfuscated audience measurement via an audience measurement server, according to one implementation.

FIG. 3 is a flow chart of one implementation of a method 300 for obfuscated audience measurement, in which the audience measurement service is unaware or agnostic to any client characteristics or demographic data. At step 302, the audience measurement server may receive a content identifier and/or one or more client identifiers. In some implementations, as discussed above, the audience measurement server may receive the content identifier and client identifier(s) from the client, such as via a relay ping or redirection request, from a plug-in or collection agent on the client, from a content provider, or from a panel provider. In some implementations, the client identifier may include a cookie or hashed client or session identifier provided by a panel provider, as discussed above. At step 304, the audience measurement server may add the identifiers to a measurement or log database. In some implementations, such as when a content identifier is received in a request for the content from the client, the audience measurement server may respond with a redirection response directing the client to the content location, at step 306. Steps 302-306 may be repeated for additional clients and/or content identifiers.

At step 308, the audience measurement server may receive a request for measurement data from a panel provider. The request may include one or more data arrays, filters, bitmaps, Bloom filters, or other probabilistic data structures for use in filtering client identifiers. As discussed above, in some implementations, the request may not identify the characteristic or trait of client identifiers to be retrieved, but may only identify the desired client identifiers via an intersection of the results of application of the plurality of filters.

At step 310, the audience measurement server may apply a filter or data array to select a first subset of client identifiers. In one implementation, applying the filter or data array may comprise using a bitmap as a mask against a bitmap for each client identifier, with client identifiers with mask-matching bitmaps selected for the first subset. In another implementation, applying the filter or data array may comprise determining a logical biconditional of each client identifier or hashed identifier against the data array or filter, with client identifiers meeting the biconditional requirement selected for the subset. If there are additional arrays in the request, in some implementations, step 310 may be repeated for each array as shown. As discussed above, in some implementations, subsets may be selected separately for each array to enhance anonymity, while in other implementations, each array or filter may be applied to the previously determined subset, to reduce memory requirements.

At step 312, in some implementations, the audience measurement server may determine if the size of any subset generated at step 310 (e.g. the number of unique client identifiers and/or unique hash identifiers in the generated subset) is less than a predetermined threshold n. If so, then it may be possible to identify an individual. Accordingly, to enhance privacy, then in some implementations, at step 314, the audience measurement server may calculate a hash of each client identifier in the subset(s). In some implementations, a different hash calculation or hash salt may be used for each subset. In one such implementation, each data array used to select a subset may be used as salt for a hash calculation of client identifiers in the subset. In another such implementation, a clock time may be used as salt for each hash calculation (e.g. a clock time at which the hash calculation is first performed on client identifiers in a subset), such that the hash for each subset is salted with a different clock value. The subsets may then be merged or aggregated to generate a further subset of client identifiers at step 318. Measurement data for the further subset, such as an aggregated set of content identifiers of content received by the clients corresponding to the client identifiers of the further subset, may be retrieved from the event log database, and may be transmitted to the panel provider at step 320.

If the size of any subset generated at step 310 is not less than the threshold, then at step 316, the subsets may be intersected to select a further subset of client identifiers or hashed identifiers that are included in each subset. As discussed above, at step 318, measurement data for the further subset, such as an aggregated set of content identifiers of content received by the clients corresponding to the client identifiers of the further subset, may be retrieved from the event log database, and may be transmitted to the panel provider at step 320. In some instances, although the initial subsets have a size greater than the threshold at step 312, the resulting further subset from the intersection of initial subsets at step 316 may have a size less than the threshold. Accordingly, in some implementations, step 312 may be performed after step 316. If the further subset has a size greater than the threshold, then the method may proceed to step 318. If the further subset does not have a size greater than the threshold, then the method may proceed to step 314 as discussed above, with the initial subsets hashed and merged to protect the anonymity of the clients.

As discussed above, in many such implementations, the collected data may be anonymized or disambiguated to protect the privacy, particularly for individuals that are not panel participants. In many such implementations or similar situations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). Client devices receiving content and providing relay pings, identifiers, or other data to an audience measurement service and/or panel provider may be smart television modules. The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for online audience measurement via obscured characteristics, comprising:
   receiving, by an audience measurement server, from each of a plurality of client devices, a communication transmitted from said client device comprising an identification of an item of content received from a content provider and an identifier of said client device comprising a mask identifying a plurality of obscured characteristics received from a panel measurement service;
   receiving, by the audience measurement server from the panel measurement service, a request for measurement data of panel members of said panel measurement service, the request comprising a first data array comprising a first probabilistic data structure identifying a hashed first characteristic obscured from the audience measurement server and a second data array comprising a second probabilistic data structure identifying a hashed second characteristic obscured from the audience measurement server;
   comparing, by the audience measurement server and with a logical biconditional calculation, the mask identifying the plurality of obscured characteristics from each of the plurality of client devices to the first characteristic obscured from the audience measurement server of the first data array to select a first subset of the received communications having the first characteristic;
   comparing, by the audience measurement server and with the logical biconditional calculation, the mask identifying the plurality of obscured characteristics from each of the plurality of client device to the second characteristic obscured from the audience measurement server of the second data array to select a second subset of the received communications having the second characteristic;
   selecting, by the audience measurement server, a third subset of the received communications comprising the intersection of the first subset and the second subset;
   aggregating, by the audience measurement server and based on the third subset of the received communications being below a predetermined threshold, the first subset of the received communications having the first characteristic and the second subset of the received communications having the second characteristic to generate a first audience measurement value for the first subset and a second audience measurement value for the second subset; and
   transmitting, by the audience measurement server to the panel measurement service, the first audience measurement value and the second audience measurement value.

2. The method of claim 1, wherein the identifier of the client device in each received communication further comprises a first identifier of the client device provided by the panel measurement service, and a second identifier of the client device provided by a manufacturer of the client device.

3. The method of claim 2, wherein comparing the received communications to the first data array to select the first subset of the received communications comprises identifying an intersection between a first identifier of a first client device and the first data array; and wherein comparing the received communications to the second data array to select the second subset of the received communications comprises identifying an intersection between a second identifier of the first client device and the second data array.

4. The method of claim 2, wherein the first identifier of the client device comprises a data array generated by the panel measurement service; and wherein comparing the received communications to the first data array to select the first subset of the received communications further comprises selecting a received communication for inclusion in the first subset, responsive to a non-zero intersection between the first identifier of the received communication and the first data array of the request.

5. The method of claim 1, further comprising hashing each identifier of a client device in the first subset of the received communications with a first hash function, and hashing each identifier of a client device in the second subset of the received communications with a second, different hash function, responsive to the determination; and
   wherein transmitting the generated measurement data further comprises transmitting the hashed identifiers of the client devices.

6. The method of claim 1, wherein the first data array or second data array comprises a bitmap.

7. A system for online audience measurement via obscured characteristics, comprising:

a device, in communication with a plurality of client devices and a panel measurement server, executing an audience measurement server configured for:

receiving, from each of a plurality of client devices, a communication transmitted from said client device comprising an identification of an item of content received from a content provider and an identifier of said client device comprising a mask identifying a plurality of obscured characteristics received from a panel measurement service;

receiving, from the panel measurement service, a request for measurement data of panel members of said panel measurement service, the request comprising a first probabilistic data structure identifying a hashed first characteristic obscured from the audience measurement server and a second data array comprising a second probabilistic data structure identifying a hashed second characteristic obscured from the audience measurement server;

comparing, with a logical biconditional calculation, the mask identifying the plurality of obscured characteristics from each of the plurality of client devices to the first characteristic obscured from the audience measurement server of the first data array to select a first subset of the received communications having the first characteristic;

comparing, with the logical biconditional calculation, the mask identifying the plurality of obscured characteristics from each of the plurality of client devices to the second characteristic obscured from the audience measurement server of the second data array to select a second subset of the received communications having the second characteristic;

selecting a third subset of the received communications comprising the intersection of the first subset and the second subset;

aggregating, based on the third subset of the received communications being below a predetermined threshold, the first subset of the received communications having the first characteristic and the second subset of the received communications having the second characteristic to generate a first audience measurement value for the first subset and a second audience measurement value for the second subset; and transmitting, to the panel measurement service, the first audience measurement value and the second audience measurement value.

8. The system of claim 7, wherein the identifier of the client device in each received communication further comprises a first identifier of the client device provided by the panel measurement service, and a second identifier of the client device provided by a manufacturer of the client device.

9. The system of claim 8, wherein the audience measurement server is further configured for identifying an intersection between a first identifier of a first client device and the first data array, and identifying an intersection between a second identifier of the first client device and the second data array.

10. The system of claim 8, wherein the first identifier of the client device comprises a data array generated by the panel measurement service; and wherein the audience measurement server is further configured for selecting a received communication for inclusion in the first subset, responsive to a non-zero intersection between the first identifier of the received communication and the first data array of the request.

11. The system of claim 7, wherein the audience measurement server is further configured for hashing each identifier of a client device in the first subset of the received communications with a first hash function, and hashing each identifier of a client device in the second subset of the received communications with a second, different hash function, responsive to the determination; and transmitting the hashed identifiers of the client devices.

12. The system of claim 7, wherein the first data array or second data array comprises a bitmap.

13. A non-transitory computer-readable storage medium storing instructions that when executed by one or more data processors, cause the one or more data processors to perform operations comprising:

receiving, from each of a plurality of client devices, a communication transmitted from said client device comprising an identification of an item of content received from a content provider and an identifier of said client device comprising a mask identifying a plurality of obscured characteristics received from a panel measurement service;

receiving, from the panel measurement service, a request for measurement data of panel members of said panel measurement service, the request comprising a first probabilistic data structure identifying a hashed first characteristic obscured from the audience measurement server and a second data array comprising a second probabilistic data structure identifying a hashed second characteristic obscured from the audience measurement server;

comparing, with a logical biconditional calculation, the mask identifying the plurality of obscured characteristics from each of the plurality of client devices to the first characteristic obscured from the audience measurement server of the first data array to select a first subset of the received communications having the first characteristic;

comparing, with the logical biconditional calculation, the mask identifying the plurality of obscured characteristics from each of the plurality of client devices to the second characteristic obscured from the audience measurement server of the second data array to select a second subset of the received communications having the second characteristic;

selecting a third subset of the received communications comprising the intersection of the first subset and the second subset;

aggregating, based on the third subset of the received communications being below a predetermined threshold, the first subset of the received communications having the first characteristic and the second subset of the received communications having the second characteristic to generate a first audience measurement value for the first subset and a second audience measurement value for the second subset; and transmitting, to the panel measurement service, the first audience measurement value and the second audience measurement value.

14. The non-transitory computer-readable storage medium of claim 13, wherein the instructions further cause the one or more data processors to perform operations comprising:

hashing each identifier of a client device in the first subset of the received communications with a first hash function, responsive to the third subset of the received communications being below a predetermined threshold;

hashing each identifier of a client device in the second subset of the received communications with a second, different hash function, responsive to the third subset of the received communications being below a predetermined threshold; and transmitting the hashed identifiers of the client devices.

* * * * *